United States Patent
Rule et al.

(10) Patent No.: US 10,691,938 B1
(45) Date of Patent: Jun. 23, 2020

(54) SYSTEMS AND METHODS FOR AUTHENTICATING A STACK OF CARDS

(71) Applicant: Capital One Services, LLC, McLean, VA (US)

(72) Inventors: Jeffrey Rule, McLean, VA (US); Bryant Yee, McLean, VA (US); Colin Hart, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/588,381

(22) Filed: Sep. 30, 2019

(51) Int. Cl.
*G06K 9/00* (2006.01)
*G06K 9/62* (2006.01)
*G06Q 20/40* (2012.01)
*G06K 19/06* (2006.01)
*B42D 25/23* (2014.01)

(52) U.S. Cl.
CPC ....... *G06K 9/00483* (2013.01); *G06K 9/6202* (2013.01); *G06K 19/06028* (2013.01); *G06Q 20/401* (2013.01); *B42D 25/23* (2014.10)

(58) Field of Classification Search
CPC .......... G06K 19/06028; G06K 9/6202; G06Q 20/401; B42D 25/23
See application file for complete search history.

(56) References Cited

U.S. PATENT DOCUMENTS

| | | | |
|---|---|---|---|
| 6,487,301 B1 | 11/2002 | Zhao | |
| 6,843,418 B2 | 1/2005 | Jones et al. | |
| 6,860,375 B2 | 3/2005 | Hallowell et al. | |
| 7,016,767 B2 | 3/2006 | Jones et al. | |
| 7,103,438 B2 | 9/2006 | Hallowell et al. | |
| 7,201,320 B2 | 4/2007 | Csulits et al. | |
| 7,505,831 B2 | 3/2009 | Jones et al. | |
| 7,873,576 B2 | 1/2011 | Jones et al. | |
| 8,459,436 B2 | 6/2013 | Jenrick et al. | |
| 8,725,289 B2 | 5/2014 | Klein et al. | |
| 10,223,856 B2 | 3/2019 | Johnson et al. | |

(Continued)

FOREIGN PATENT DOCUMENTS

| | | |
|---|---|---|
| AU | 2013217210 B2 | 8/2015 |
| CN | 1427977 B | 5/2010 |

*Primary Examiner* — Mekonen T Bekele
(74) *Attorney, Agent, or Firm* — Greenberg Traurig, LLP

(57) ABSTRACT

In some embodiments, the present disclosure provides various techniques for authenticating stack(s) of cards, for example, during a change of their custody, by printing at least one unique pattern across at least one side of a stack of cards at a first point in time; recording the pattern as printed on the stack of cards; and comparing the pattern shown on the stack of cards at a later point in time to the originally recorded pattern and confirming the presence or absence of change(s) to such pattern. In some embodiments, the present disclosure also provides various techniques to validate a particular card within the stack of cards by comparing at least one side edge of a card in the stack that comprises a portion of the unique pattern that was printed across the side of the parent stack from which it belongs to a prior recorded image of the printed pattern on that particular parent stack and confirming that the information or markings on the at least one side edge of the card is a component of the unique pattern that was printed on the at least one side of its parent stack.

18 Claims, 4 Drawing Sheets

(56) References Cited

U.S. PATENT DOCUMENTS

| | | | |
|---|---|---|---|
| 2002/0170966 A1* | 11/2002 | Hannigan | H04N 1/32144 235/462.01 |
| 2007/0016790 A1* | 1/2007 | Brundage | G06T 1/0071 713/176 |
| 2007/0095928 A1* | 5/2007 | Balinsky | G06F 21/35 235/492 |
| 2008/0149713 A1* | 6/2008 | Brundage | G06T 1/0071 235/435 |
| 2011/0227326 A1* | 9/2011 | Elgar | B32B 37/185 283/70 |
| 2012/0308003 A1* | 12/2012 | Mukherjee | H04L 9/3247 380/243 |
| 2013/0202185 A1* | 8/2013 | Irwin, Jr. | G07F 7/0893 382/137 |
| 2016/0104041 A1* | 4/2016 | Bowers | G06K 9/00483 382/115 |
| 2017/0193727 A1* | 7/2017 | Van Horn | G07D 7/12 |
| 2017/0323279 A1* | 11/2017 | Dion | G07F 19/20 |

\* cited by examiner

SYSTEMS AND METHODS FOR AUTHENTICATING A STACK OF CARDS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to systems and methods for authenticating stack(s) of cards (such as credit or debit cards).

BACKGROUND OF TECHNOLOGY

Image patterns may be printed on physical surfaces.

SUMMARY OF DESCRIBED SUBJECT MATTER

In some embodiments, the present disclosure provides an exemplary technically improved method comprising: applying at least one first pattern to at least one side of a stack of cards by at least one processor at a first time, where the at least one first pattern is unique to the stack of cards; and where the at least one side of the stack of cards comprises a plurality of respective side edges of cards of the stack of cards; where each respective side edge of each respective card has at least one unique portion of the at least one first pattern; and receiving, by the at least one processor, at a second time, at least one visual recording of the at least one side of the stack of cards; determining, by the at least one processor, from the at least one visual recording, at least one second pattern that is present on the at least one side of the stack of cards; comparing, by the at least one processor, the at least one first pattern to the at least one second pattern to determine: i) a presence of at least one physical change that has occurred with the stack of cards between the first time and the second time, or ii) a lack of the at least one physical change with the stack of cards between the first time and the second time.

In some embodiments, the present disclosure provides an exemplary technically improved system comprising: a computer memory, a processor configured to: receive pattern data identifying at least one first pattern that has been applied to at least one side of a stack of cards at a first time; receive, at a second time, at least one visual recording of at least one side of the stack of cards; determine, from the at least one visual recording, at least one second pattern that is present on the at least one side of the stack of cards; and compare the at least one first pattern to the at least one second pattern to determine: i) a presence of at least one physical change that has occurred with the stack of cards between the first time and the second time, or ii) a lack of the at least one physical change with the stack of cards between the first time and the second time.

In some embodiments, the present disclosure provides an exemplary technically improved method comprising: a stack of cards, where in an original condition, the stack of cards comprises: at least one first pattern that is present on at least one side of the stack of cards; where the at least one first pattern is unique to the stack of cards; where the at least one side of the stack of cards comprises a plurality of respective side edges of cards of the stack of cards; where each respective side edge of each respective card has at least one unique portion of the at least one first pattern; and in a subsequent condition, the stack of cards comprises: at least one second pattern that is present on the at least one side of the stack of cards; where the subsequent condition differs from the original condition; where the stack of cards is configured such that a comparison of the at least one first pattern and the at least one second pattern allows to determine: i) a presence of at least one physical change that has occurred with the stack of cards between the original condition and the subsequent condition, or ii) a lack of the at least one physical change with the stack of cards between the original condition and the subsequent condition.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
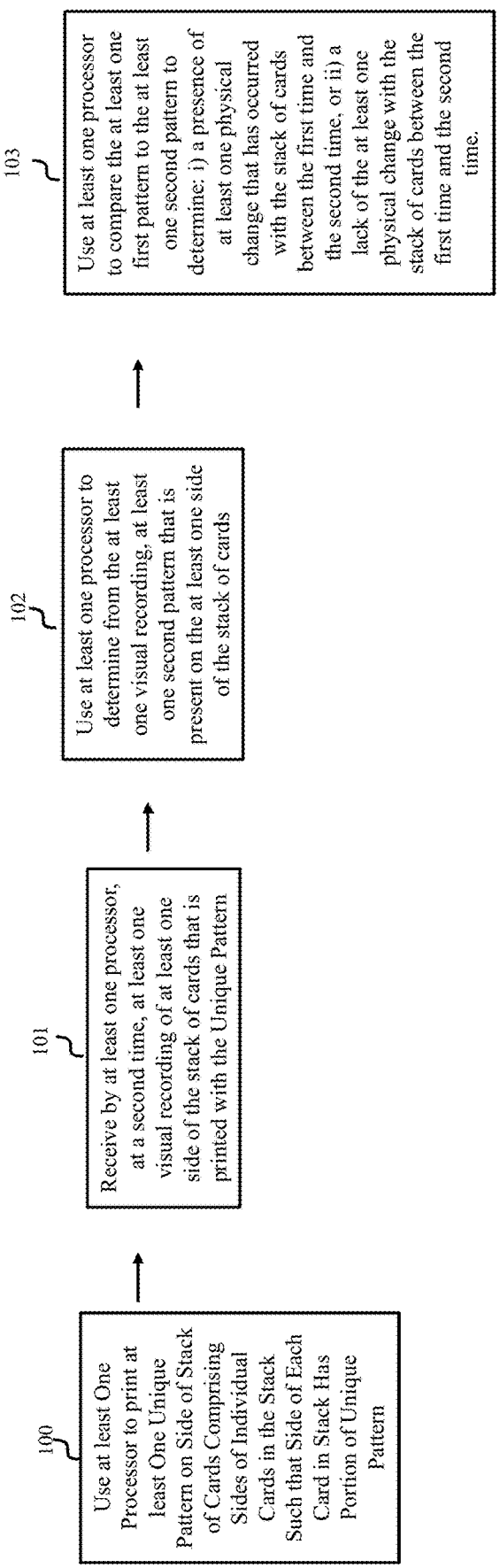
FIGS. 1-4 depict one or more schematic diagrams that are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a", "an", and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," pertains to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "user" or "consumer" shall have a meaning of at least one user or at least one consumer, respectively.

As used herein, the term "mobile computing device" or the like, may refer to any portable electronic device that may include relevant software and hardware. For example, a "mobile computing device" can include, but is not limited to, any electronic computing device that is configured to among other things: receive pattern data identifying at least one first pattern that has been applied to at least one side of a stack of cards at a first time; receive, at a second time, at least one visual recording of at least one side of the stack of cards; determine, from the at least one visual recording, at least one second pattern that is present on the at least one side of the stack of cards; and compare the at least one first pattern to the at least one second pattern to determine: i) a presence of at least one physical change that has occurred with the stack of cards between the first time and the second time, or ii) a lack of the at least one physical change with the stack of cards between the first time and the second time.

In some embodiments, a "mobile computing device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive pattern data identifying at least one first pattern that has been applied to at least one side of a stack of cards at a first time; receive, at a second time, at least one visual recording of at least one side of the stack of cards; determine, from the at least one visual recording, at least one second pattern that is present on the at least one side of the stack of cards; and compare the at least one first pattern to the at least one second pattern to determine: i) a presence of at least one physical change that has occurred with the stack of cards between the first time and the second time, or ii) a lack of the at least one physical change with the stack of cards between the first time and the second time.

A non-limiting example of a mobile computing device that may be used in in accordance of this method may include an iPhoneX™ manufactured by Apple Inc., CA, or a Samsung Android smart phone manufactured by Samsung Electronics, NJ, and configured to include relevant software and/or firmware.

FIG. 1 illustrates a block diagram depicting a process according to some embodiments of the present disclosure. As shown in FIG. 1, using at least one processor, at Step 100, at least one first pattern is applied to at least one side of a stack of card at a first time, where the at least one first pattern is unique to the stack of cards, and where the at least one side of the stack of cards comprises a plurality of respective side edges of cards of the stack of cards; and where each respective side edge of each respective card has at least one unique portion of the at least one first pattern.

As Step 101 illustrates, at a second time, at least one processor is used to receive at least one visual recording of the at least one side of the stack of cards.

In Step 102, at least one processor is used to determine from the at least one visual recording, at least one second pattern that is present on the at least one side of the stack of cards.

In Step 103, at least one processor is used to compare, the at least one first pattern to the at least one second pattern to determine: i) a presence of at least one physical change that has occurred with the stack of cards between the first time and the second time, or ii) a lack of the at least one physical change with the stack of cards between the first time and the second time.

Returning to FIG. 1, the present disclosure may similarly include (not shown in FIG. 1) a processor, a memory, input/output devices, and communication circuitry and interface for communication with the Web and App Servers, for example.

As one non-limiting Example, a financial institution may send stacks of cards that are blank on each face of each card or whose faces may not have been personalized for use by consumers to a third-party vendor for processing or for issuance to consumers. Before transmitting the stacks of cards, the financial institution uses a printer to print at least one unique pattern across at least one side of each stack of cards. As shown in FIG. 1, an exemplary unique pattern (such as a barcode) would be printed across the side of the stack of cards and would be common to all cards in a particular stack. In some embodiments, the pattern may be invisible to the naked eye but visible to other devices.

In some embodiments, each stack of cards may include from 2 cards to 25 cards. In some embodiments, each stack of cards may include from 2 cards to 50 cards. In some embodiments, each stack of cards may include from 2 cards to 100 cards. In some embodiments, each stack of cards may include from 2 cards to 500 cards.

As also shown in FIG. 1, an additional overlay of an image such as the logo of the financial institution or a personalized image of the third-party vendor or some other image may be applied to the side of each stack.

At least some embodiments of the present disclosure may employ at least one optical reading device (including but not limited to, for example, a barcode scanner, a camera of a mobile computing device, and a point-of-service payment device) to obtain at least one visual recording of the pattern and/or the overlaid image on at least one side of the stack of cards. In some embodiments, the visual recording may be stored for future reference in at least one database.

For example, once the cards are transmitted from the financial institution to the third-party site, the third-party vendor or partner may store the cards in a secure site until needed. Upon request or as needed, the third-party vendor may remove the cards from their secure location and further process the cards prior to issuing to a customer. For example, the third-party vendor may load the cards onto a machine for instant issuance to customers or may personalize the cards. For example, personalizing the cards may be done by printing the name of the customer, information regarding the customer's account number, the expiration date of the card, and other relevant information about the customer or the customer's account, on the face and/or the back of the card before issuing the card to a customer. By way of further illustration, and without any limitation, each card may be further customized to operate as a credit card, debit card or an identification card or any other similarly suitable purpose.

Prior to processing the cards however, the vendor or partner may need to confirm that the cards it received from the financial institution are the same as the cards it is about to process, and that none of the cards it received were lost in transit, stolen, or otherwise unaccounted for. According to at least one embodiment of this invention, using at least one optical reading device, including but not limited to, for example, a barcode scanner, a camera of a mobile computing device, and a point-of-service payment device, and/or with the aid of a processor, the third-party may be able to compare the pattern currently printed on the stack of cards it has removed from storage and/or is about to process to the recording of the pattern as originally printed on the stack of cards and/or obtained by the financial institution prior to transmission of the cards to the third-party. In some embodiments, the third-party's computing equipment can then use this comparison to determine whether the pattern on the stack of cards it is about to process is the same or different from the recorded pattern.

Figure 4:
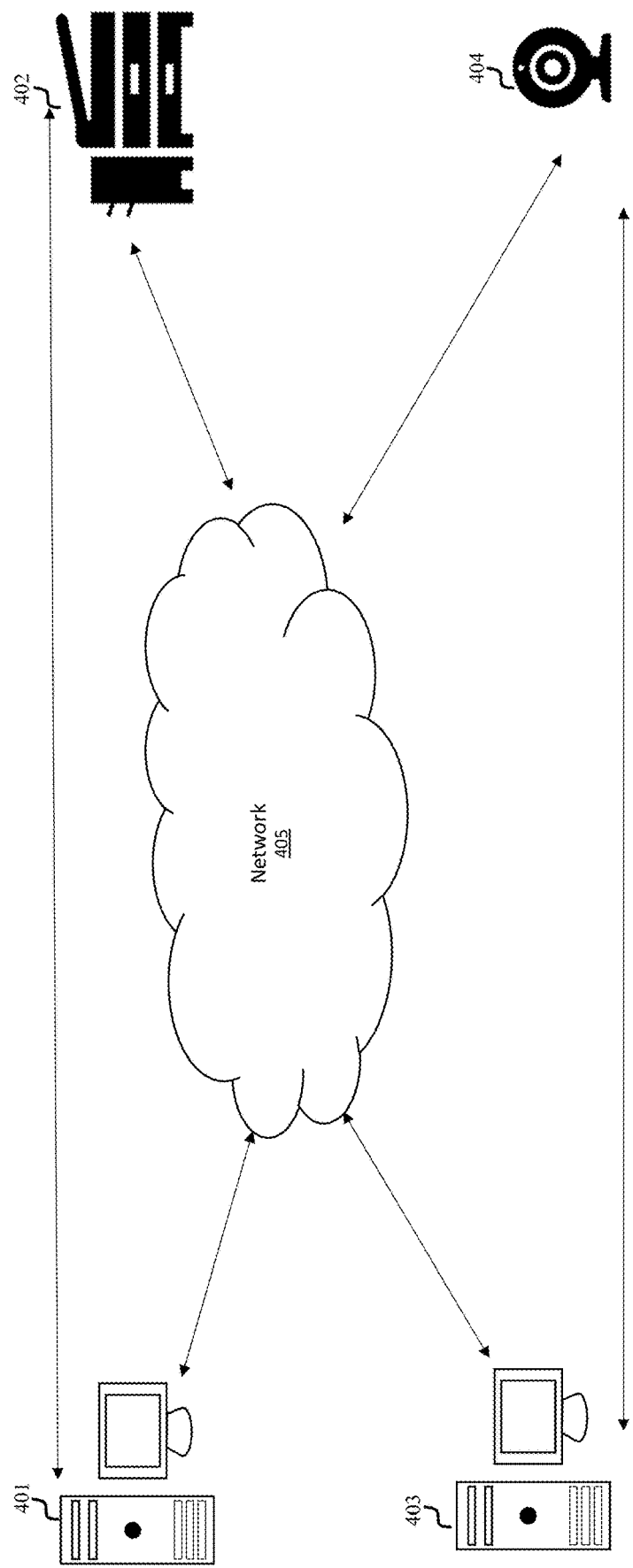

In some embodiments, the third-party's computing equipment may transmit the acquired pattern to a computer system of the sender (e.g., financial institution issuing the stack of cards) which would perform the comparison and send back information identifying whether any adulteration occurred. In such exemplary embodiments, the sender protects the knowledge of the pattern from the third party. In some embodiments, the sender's computer system may be programmed to deactivate particular adulterated card(s) or the entire stack whose integrity has been compromised. As shown in FIG. 4 for example, using at least one optical reading device, 404, (including but not limited to, a barcode scanner, a camera of a mobile computing device, and a point-of-service payment device), the third-party's computing system, 403, may transmit the acquired pattern directly to a computer 401 of the sender over network 405. Using at least one processor, the computer system of the sender 401 performs the comparison of the pattern received from the third party's computer system 403 to the pattern originally printed by printer 402 and sends back information over network 405 identifying whether any adulteration has occurred between the original printing of the pattern by printer 402 and the pattern received from the third party's computer system 403. If any adulteration has occurred, in some embodiments, the computer system of the sender 401 may be programmed to deactivate particular adulterated card(s) or the entire stack whose integrity has been compromised.

To the extent there is a change or a difference in the pattern, using at least one processor, the third-party vendor may be able to locate the area of difference and further identify which cards are missing from the stack and immediately alert the financial institution or put in place countermeasures to locate the missing cards.

The vendor may also be able to confirm the authenticity of a single card in a particular stack by using at least one optical reading device, including but not limited to, for example, a barcode scanner, a camera of a mobile computing device, and a point-of-service payment device, to read the markings on the side edge of a single card, and with the aid of a processor, compare the markings on the side-edge of that card to the recording of the pattern as originally printed on the stack of cards and obtained by the financial institution; determine where the unique markings on the card align with the pattern on the parent stack, and determine whether that card belongs to that particular stack or hails from a different stack. This method of authenticating a card within a stack may be further based at least in part on at least one other authentication criterion (including but not limited to multi-factor authentication (MFA)). In yet other embodiments, MFA, for example, without limitation, may use biometrics (e.g., fingerprint, voice recognition, etc.) and/or a password entered by the user and/or a swiping of a mobile device screen by a finger of the user and/or a proximity of the credit card to a mobile device or any client device.

At least some embodiments of the present disclosure may utilize the unique markings on the side of each card to perform at least one activity with respect to that card such as, without limitation, authorizing a payment transaction, identifying an account information relating to the card including but not limited to the customer's name, account number, address, available balance, amounts outstanding or the financial institution that issued the card.

Figure 2:

FIG. 2 illustrates an exemplary illustration of some features in accordance with at least some embodiments of the present disclosure. FIG. 2 illustrates a stack of cards on whose side is printed the logo of a financial institution. In addition to or instead of the exemplary logo of the financial institution, the side of the stack of cards may also have a barcode printed across the side of the cards. In addition to a logo or a barcode, the present disclosure contemplates that many other unique patterns may be printed on the side of a stack of cards including without limitation pictures of famous individuals, foods, people, pets, etc.

Figure 3:
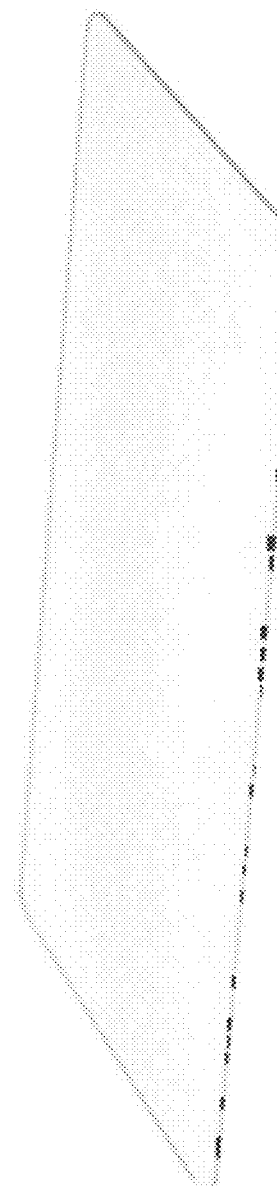

FIG. 3 illustrates a single card from a stack of cards comprising markings on its side edge that reflect the portion of the unique pattern that was printed on the side edge of that card during application of the unique pattern to the parent stack of the card (of which the single card was a part).

As described above, the processors of the present disclosure may be further configured to execute code for performing the tasks taught by the embodiments as described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems or methods of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, one or more components of exemplary inventive computer-based systems or methods of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In accordance with at least some embodiments of the present disclosure, the illustrative systems and methods disclosed herein allow for almost instantaneous and specific detection of various disruptions in a stack of cards (e.g., missing card(s)) when there would be a change of custody over the stack of cards. For example, during a transport of the stack of card from a financial issuer of the cards to a third-party vendor, utilizing an optical scanner to study the printed pattern at the destination, the illustrative system would be able to identify disruption(s) in the pattern occurred so that the precise missing card(s) can be identified. The system and method are also more cost effective to detect any missing or altered cards from the original stack of cards as it does not require the presence of several people to authenticate the cards. In some embodiments, the exemplary system and method may employ one or more other suitable authentication techniques to further authenticate card(s) upon change of custody.

At least some aspects of the present disclosure will now be described with reference to the following numbered clauses.

1. A method comprising:
   causing, by at least one processor, at a first time, to apply at least one first pattern to at least one side of a stack of cards;
      wherein the at least one first pattern is unique to the stack of cards;
      wherein the at least one side of the stack of cards comprises a plurality of respective side edges of cards of the stack of cards;
      wherein each respective side edge of each respective card has at least one unique portion of the at least one first pattern; and
   receiving, by the at least one processor, at a second time, at least one visual recording of the at least one side of the stack of cards;
   determining, by the at least one processor, from the at least one visual recording, at least one second pattern that is present on the at least one side of the stack of cards;
   comparing, by the at least one processor, the at least one first pattern to the at least one second pattern to determine:
      i) a presence of at least one physical change that has occurred with the stack of cards between the first time and the second time, or
      ii) a lack of the at least one physical change with the stack of cards between the first time and the second time.
2. The method of clause 1, wherein the at least one first pattern is a barcode.
3. The method of clause 1, wherein the at least one first pattern comprises at least one image.
4. The method of clause 1, wherein the stack of cards comprises at least one of:
   i) credit cards,
   ii) debit cards, and
   iii) identification cards.
5. The method of clause 1, further comprising:
   acquiring, by at least one optical reading device, the at least one visual recording of the at least one side of the stack of cards.
6. The method of clause 5, wherein the at least one optical reading device is chosen from:
   i) a barcode scanner,
   ii) a camera of a mobile computing device, and
   iii) a point-of-service payment device.
7. The method of clause 1, further comprising:
   authenticating, by the at least one processor, a respective card based at least in part on a respective unique portion of the at least one first pattern that is present on a respective side edge of the respective card.
8. The method of clause 7, wherein the authenticating the respective card is further based at least in part on at least one other authentication criterion.
9. The method according to clause 1, further comprising:
   utilizing, by the at least one processor, the at least one unique portion of the at least one first pattern, being present on a respective side edge of a particular card, to cause to perform at least one activity with respect to the particular card.
10. The method according to clause 9, wherein the at least one activity is an authorization of a payment for at least one transaction.

11. The method according to clause 9, wherein the at least one activity is to identify account information relating to the particular card.

12. The method of clause 1, wherein the at least one first pattern is invisible to a human eye.

13. A system comprising:
   a computer memory,
   a processor configured to:
      receive pattern data identifying at least one first pattern that has been applied to at least one side of a stack of cards at a first time;
      receive, at a second time, at least one visual recording of at least one side of the stack of cards;
      determine, from the at least one visual recording, at least one second pattern that is present on the at least one side of the stack of cards; and
      compare the at least one first pattern to the at least one second pattern to determine:
         i) a presence of at least one physical change that has occurred with the stack of cards between the first time and the second time, or
         ii) a lack of the at least one physical change with the stack of cards between the first time and the second time.

14. The system of clause 13, further comprising:
   at least one optical reading device that is configured to receive the at least one visual recording of the at least one side of the stack of cards.

15. The system of clause 14, wherein the at least one optical reading device is chosen from:
   i) a barcode scanner,
   ii) a camera of a mobile computing device, and
   iii) a point-of-service payment device.

16. The system of clause 14, wherein the optical reading device is configured to authenticate a respective card of the particular stack of cards based at least in part on at least one respective unique portion of the at least one first pattern that is present on a respective side edge of the respective card.

17. The system of clause 16, wherein the authenticating the respective card of the stack of cards is further based at least in part on at least one other authentication criterion.

18. The system of clause 13, wherein the processor is further configured to identify at least one unique portion of the at least one first pattern that is present on a respective side edge of a particular card and to perform at least one activity with respect to the particular card based at least in part on the identified at least one unique portion of the at least one first pattern.

19. The system of clause 18, wherein the at least on activity performed with respect to the particular card is to identify account information relating to the particular card.

20. A stack of cards, wherein
   in an original condition, the stack of cards comprises:
      at least one first pattern that is present on at least one side of the stack of cards;
      wherein the at least one first pattern is unique to the stack of cards;
      wherein the at least one side of the stack of cards comprises a plurality of respective side edges of cards of the stack of cards;
      wherein each respective side edge of each respective card has at least one unique portion of the at least one first pattern; and
   in a subsequent condition, the stack of cards comprises:
      at least one second pattern that is present on the at least one side of the stack of cards;
      wherein the subsequent condition differs from the original condition;
      wherein the stack of cards is configured such that a comparison of the at least one first pattern and the at least one second pattern allows to determine:
         i) a presence of at least one physical change that has occurred with the stack of cards between the original condition and the subsequent condition, or
         ii) a lack of the at least one physical change with the stack of cards between the original condition and the subsequent condition.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
   causing, by at least one processor, at a first time, to apply a first pattern of a plurality of patterns to a side of a stack of cards of a plurality of stacks of cards;
      wherein the first pattern is unique to the stack of cards;
      wherein the side of the stack of cards comprises a plurality of respective side edges of cards of the stack of cards;
      wherein each respective side edge of each respective card has a unique portion of the first pattern;
   receiving, by the at least one processor, at a second time, at least one visual recording of the side of the stack of cards;
   determining, by the at least one processor, from the at least one visual recording, a second pattern that is present on the side of the stack of cards;
   comparing, by the at least one processor, the first pattern to the second pattern to determine:
      i) a presence of a physical change that has occurred with the stack of cards between the first time and the second time, or
      ii) a lack of the physical change with the stack of cards between the first time and the second time;
   authenticating, by the at least one processor, a respective card from the stack of cards based at least in part on a respective unique portion of the first pattern that is present on a respective side edge of the respective card from the stack of cards; and
      wherein each respective pattern of the plurality of patterns is unique to each respective stack of cards of the plurality of stacks of cards between the first time and the second time.

2. The method of claim 1, wherein the first pattern is a barcode.

3. The method of claim 1, wherein the first pattern comprises at least one image.

4. The method of claim 1, wherein the stack of cards of a plurality of stacks of cards comprises at least one of:

i) credit cards,
ii) debit cards, and
iii) identification cards.

5. The method of claim 1, further comprising:
acquiring, by at least one optical reading device, the at least one visual recording of the side of the stack of cards of a plurality of stacks of cards.

6. The method of claim 5, wherein the at least one optical reading device is chosen from:
i) a barcode scanner,
ii) a camera of a mobile computing device, and
iii) a point-of-service payment device.

7. The method of claim 1, wherein the authenticating the respective card from the stack of cards is further based at least in part on at least one other authentication criterion.

8. The method according to claim 1, further comprising:
utilizing, by the at least one processor, the at least one unique portion of the first pattern, being present on a respective side edge of a particular card, to cause to perform at least one activity with respect to the particular card.

9. The method according to claim 8, wherein the at least one activity is an authorization of a payment for at least one transaction.

10. The method according to claim 8, wherein the at least one activity is to identify account information relating to the particular card.

11. The method of claim 1, wherein the first pattern is invisible to a human eye.

12. A system comprising:
a computer memory;
a processor configured to:
receive pattern data identifying a first pattern of a plurality of patterns that has been applied to a side of a stack of cards of a plurality of stacks of cards at a first time;
receive, at a second time, at least one visual recording of the side of the stack of cards;
determine, from the at least one visual recording, a second pattern that is present on the side of the stack of cards;
compare the first pattern to the second pattern to determine:
i) a presence of a physical change that has occurred with the stack of cards between the first time and the second time, or
ii) a lack of the physical change with the stack of cards between the first time and the second time;
authenticate a respective card from the stack of cards based at least in part on a respective unique portion of the first pattern that is present on a respective side edge of the respective card from the stack of cards; and
wherein each respective pattern of the plurality of patterns is unique to each respective stack of cards of the plurality of stacks of cards between the first time and the second time.

13. The system of claim 12, further comprising:
at least one optical reading device that is configured to receive the at least one visual recording of the side of the stack of cards.

14. The system of claim 13, wherein the at least one optical reading device is chosen from:
i) a barcode scanner,
ii) a camera of a mobile computing device, and
iv) a point-of-service payment device.

15. The system of claim 12, wherein the authenticating the respective card of the stack of cards is further based at least in part on at least one other authentication criterion.

16. The system of claim 12, wherein the processor is further configured to identify at least one unique portion of the first pattern that is present on a respective side edge of a particular card and to perform at least one activity with respect to the particular card based at least in part on the identified at least one unique portion of the first pattern.

17. The system of claim 16, wherein the at least one activity performed with respect to the particular card is to identify account information relating to the particular card.

18. A stack of cards, wherein
in an original condition, the stack of cards comprises:
a first pattern that is present on a side of the stack of cards;
wherein the first pattern is unique to the stack of cards of a plurality of stacks of cards;
wherein the side of the stack of cards comprises a plurality of respective side edges of cards of the stack of cards;
wherein each respective side edge of each respective card has a unique portion of the first pattern; and
in a subsequent condition, the stack of cards comprises:
a second pattern that is present on the side of the stack of cards;
wherein the subsequent condition differs from the original condition;
wherein the stack of cards is configured such that a comparison of the first pattern and the second pattern allows to determine:
i) a presence of a physical change that has occurred with the stack of cards between the original condition and the subsequent condition, or
ii) a lack of a physical change with the stack of cards between the original condition and the subsequent conditions;
wherein a respective card from the stack of cards is authenticated based at least in part on a respective unique portion of the first pattern that is present on a respective side edge of the respective card from the stack of cards; and
wherein each respective pattern of the plurality of patterns is unique to each respective stack of cards of the plurality of stacks of cards between the first time and the second time.

\* \* \* \* \*